United States Patent
Li et al.

(10) Patent No.: US 10,624,047 B2
(45) Date of Patent: Apr. 14, 2020

(54) METHOD AND DEVICE FOR TRANSMITTING UPLINK INFORMATION

(71) Applicant: Samsung Electronics Co., Ltd., Gyeonggi-do (KR)

(72) Inventors: Yingyang Li, Beijing (CN); Yi Wang, Beijing (CN); Shichang Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/099,008

(22) PCT Filed: May 15, 2017

(86) PCT No.: PCT/KR2017/005025
§ 371 (c)(1),
(2) Date: Nov. 5, 2018

(87) PCT Pub. No.: WO2017/196160
PCT Pub. Date: Nov. 16, 2017

(65) Prior Publication Data
US 2019/0159143 A1    May 23, 2019

(30) Foreign Application Priority Data

May 13, 2016 (CN) .......................... 2016 1 0319889
May 16, 2016 (CN) .......................... 2016 1 0324383
Aug. 10, 2016 (CN) .......................... 2016 1 0652034

(51) Int. Cl.
*H04W 52/36*    (2009.01)
*H04W 74/08*    (2009.01)
(Continued)

(52) U.S. Cl.
CPC ......... *H04W 52/367* (2013.01); *H04W 52/08* (2013.01); *H04W 52/14* (2013.01);
(Continued)

(58) Field of Classification Search
CPC ............. H04W 52/146; H04W 72/042; H04W 72/0413; H04W 52/34; H04W 52/367;
(Continued)

(56) References Cited

U.S. PATENT DOCUMENTS

2012/0320760 A1    12/2012  Kim et al.
2015/0057011 A1     2/2015  Di Girolamo et al.
(Continued)

FOREIGN PATENT DOCUMENTS

KR    1020110082437    7/2011
WO    WO 2015042594    3/2015

OTHER PUBLICATIONS

PCT/ISA/210 Search Report issued on PCT/KR2017/005025 (pp. 3).
PCT/ISA/237 Written Opinion issued on PCT/KR2017/005025 (pp. 9).

*Primary Examiner* — Golam Sorowar
(74) *Attorney, Agent, or Firm* — The Farrell Law Firm, P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application provides a method for transmitting uplink information, which includes the following: a UE detects control information, i.e., UL-Grant for scheduling uplink data transmissions from a base station; determines according to the control information, the number of PRBs resource allocated by the base station, determining
(Continued)

a maximum transmission power allowed in the current sub-frame, determines an uplink transmission power of the UE; executes an LBT according to UL-Grant configurations, and starts an uplink data transmission after the LBT is successful. By adopting the method of the present disclosure, the total uplink transmission power of an entire cell in one sub-frame is controlled, so as to realize coexistence with other devices. Further, by reasonably setting an LBT time period and power increase transition time, the probability of collisions among devices is reduced.

13 Claims, 8 Drawing Sheets

(51) Int. Cl.
- *H04W 52/14* (2009.01)
- *H04W 74/02* (2009.01)
- *H04W 72/04* (2009.01)
- *H04W 80/08* (2009.01)
- *H04W 72/14* (2009.01)
- *H04W 52/34* (2009.01)
- *H04W 52/08* (2009.01)

(52) U.S. Cl.
CPC ....... *H04W 52/146* (2013.01); *H04W 52/346* (2013.01); *H04W 72/0446* (2013.01); *H04W 72/0473* (2013.01); *H04W 72/14* (2013.01); *H04W 74/02* (2013.01); *H04W 74/0816* (2013.01); *H04W 80/08* (2013.01)

(58) Field of Classification Search
CPC ......... H04W 72/0446; H04W 72/0473; H04W 52/365; H04W 88/02; H04W 4/70; H04W 52/325; H04W 72/0406; H04W 72/1289; H04W 74/0833; H04W 52/281; H04W 52/40; H04W 72/04; H04L 5/001; H04L 5/0053; H04L 5/0048; H04L 5/14; H04L 5/0055; H04L 5/0023; H04L 1/1812; H04L 5/005; H04L 1/1861; H04L 5/1469; H04L 5/0073; H04L 5/0051; H04L 1/1854; H04L 5/0007; H04L 5/0091; H04L 5/0094; H04L 5/0092; H04L 1/1671; H04L 27/2601; H04L 5/0035

See application file for complete search history.

(56) References Cited

U.S. PATENT DOCUMENTS

| | | | |
|---|---|---|---|
| 2015/0085797 A1 | 3/2015 | Ji et al. | |
| 2015/0296463 A1* | 10/2015 | Charbit | H04W 52/34 455/522 |
| 2016/0095134 A1 | 3/2016 | Chen et al. | |
| 2016/0360553 A1* | 12/2016 | Cheng | H04W 16/14 |

* cited by examiner

[Fig. 1]
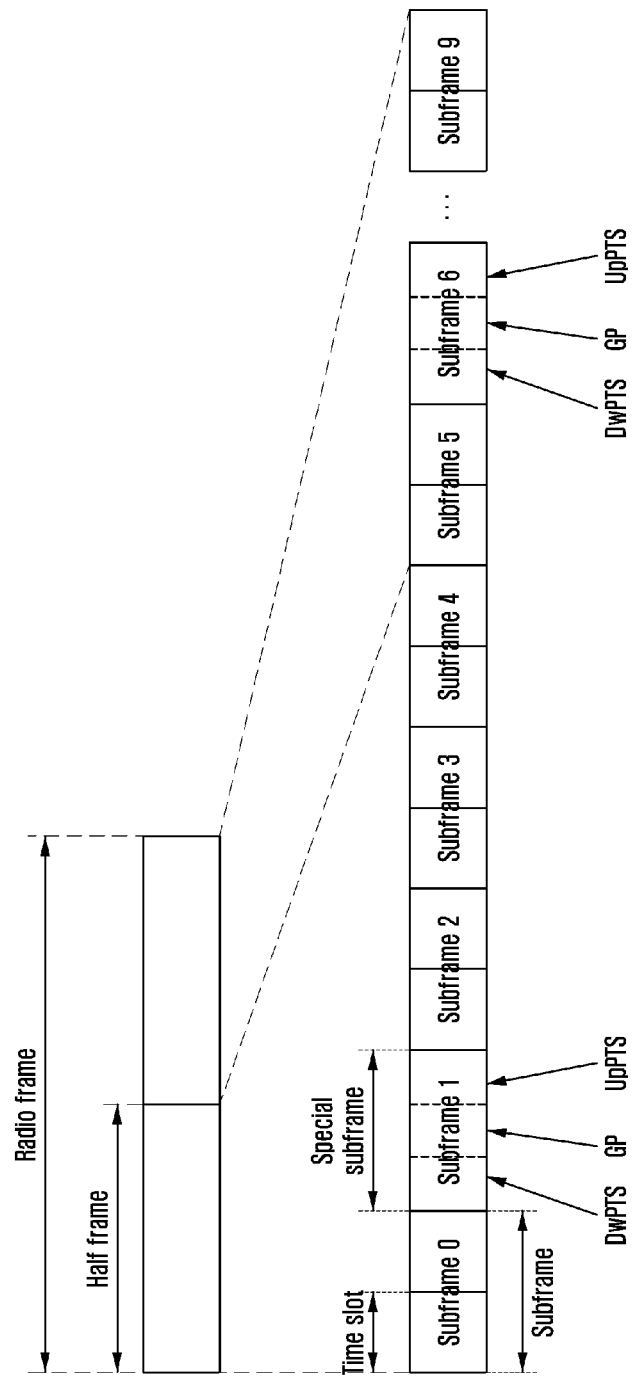

[Fig. 2]

[Fig. 3]
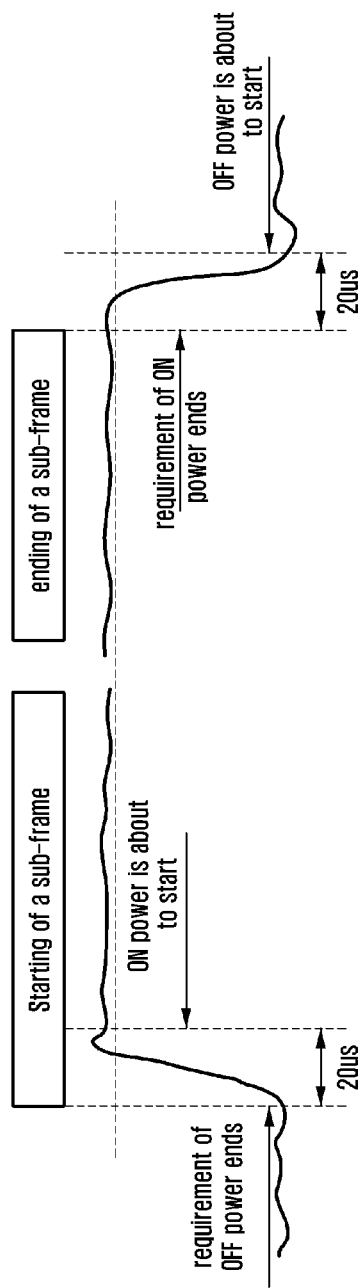

[Fig. 4]
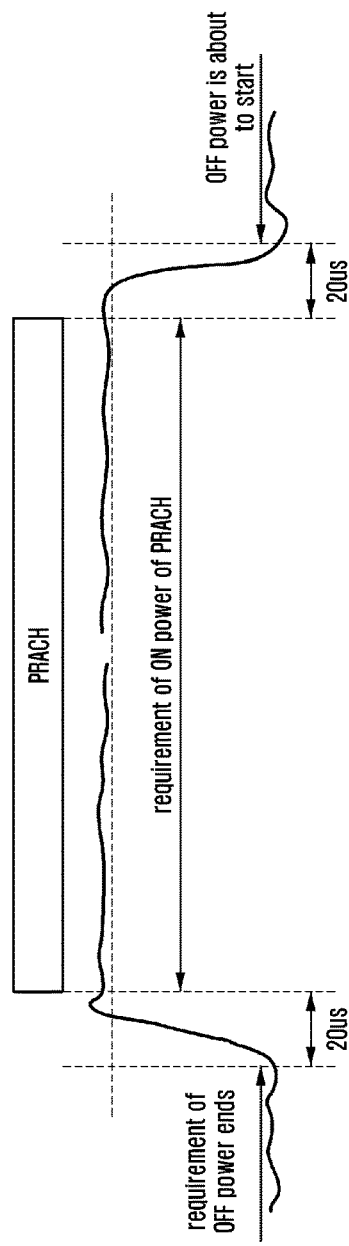
[Fig. 5]
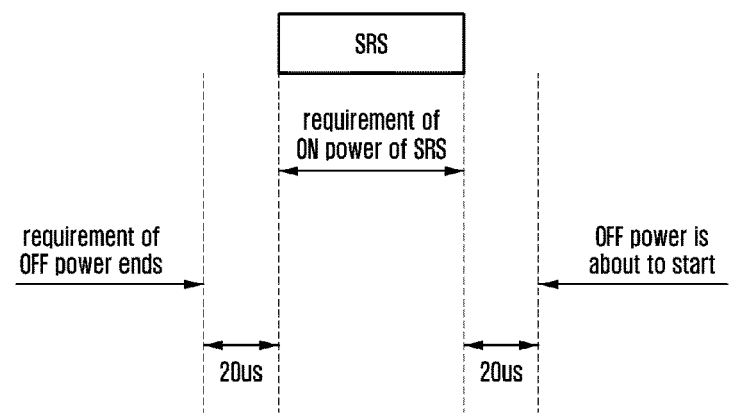

[Fig. 6]
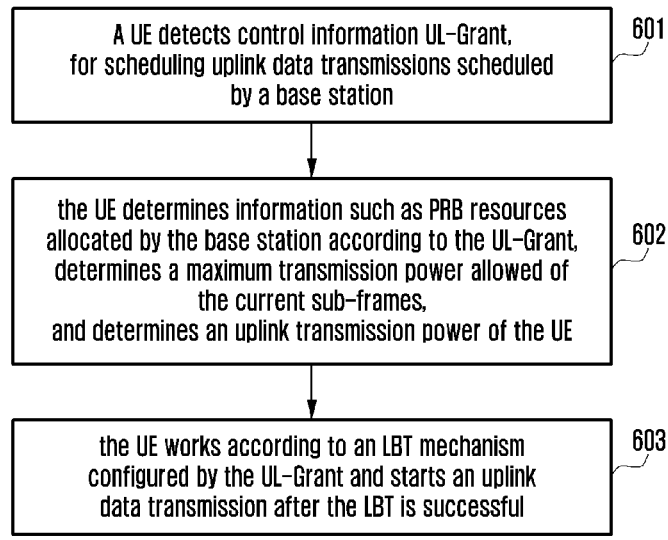
[Fig. 7]
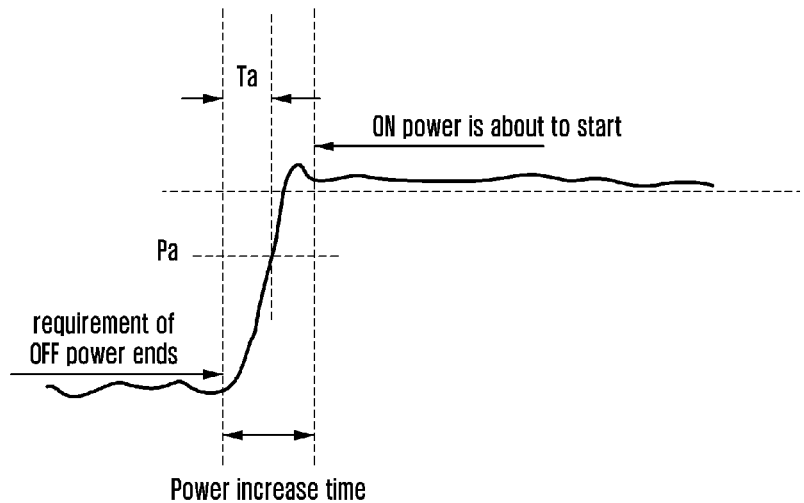
[Fig. 8]
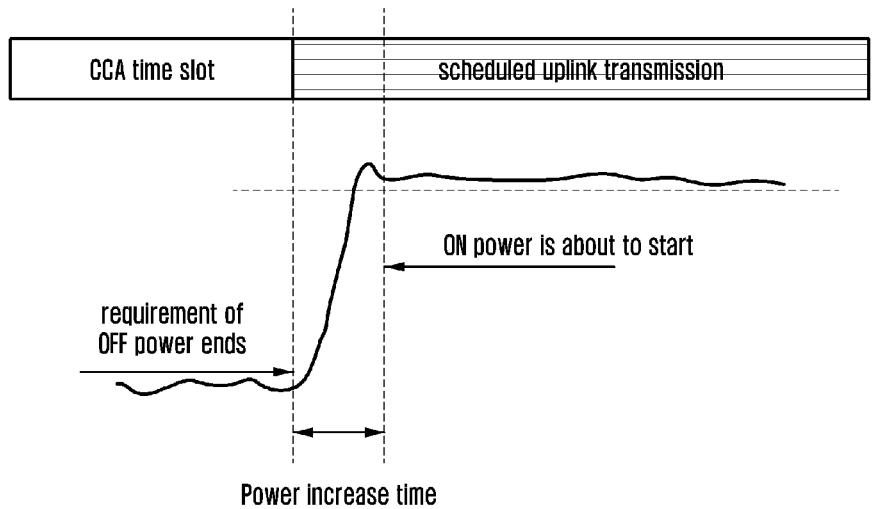

[Fig. 9]
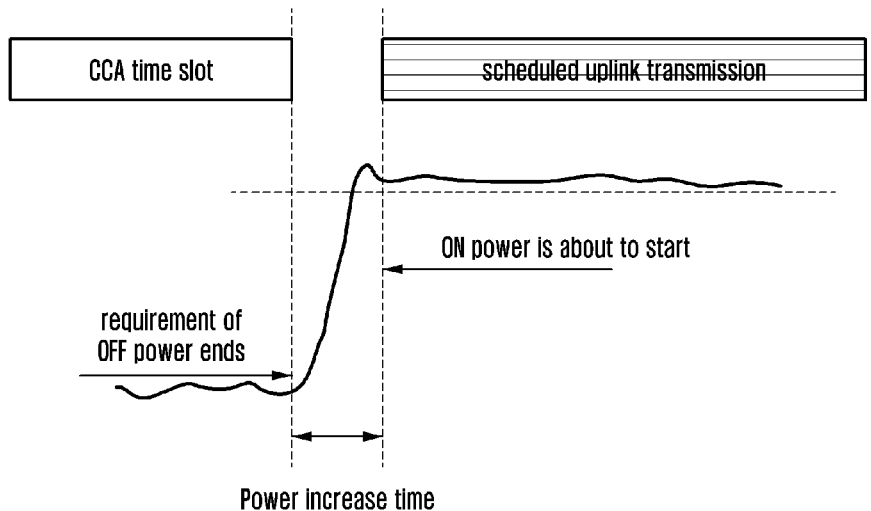
[Fig. 10]
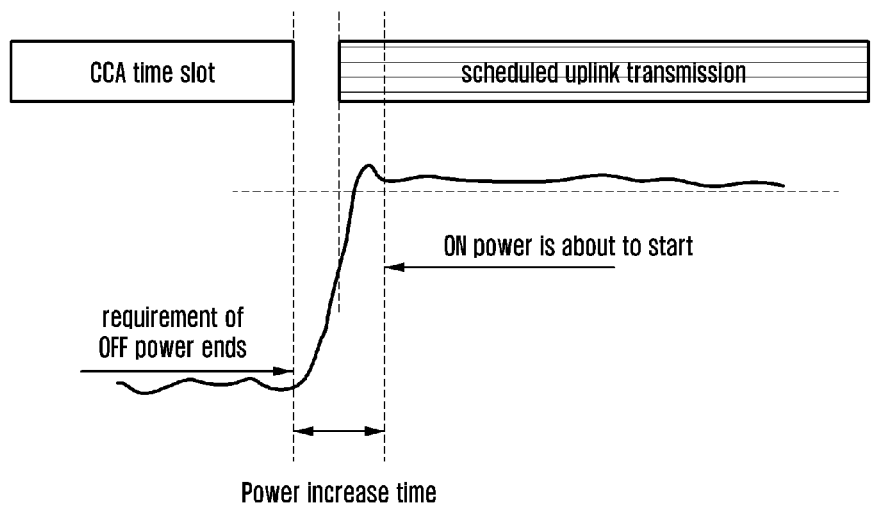
[Fig. 11]
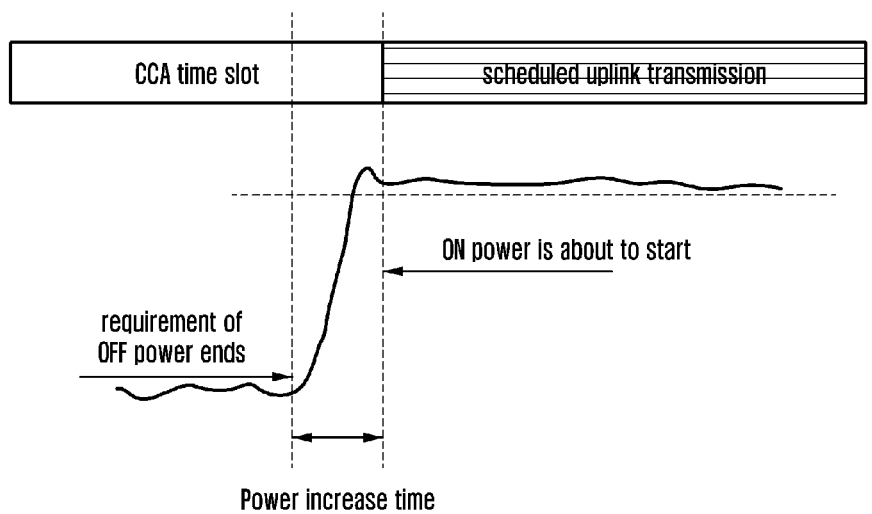

[Fig. 12]
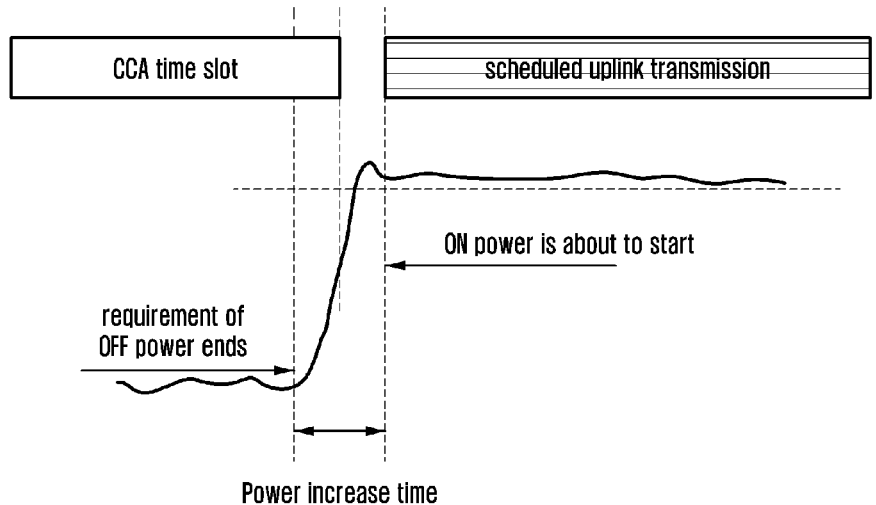
[Fig. 13]
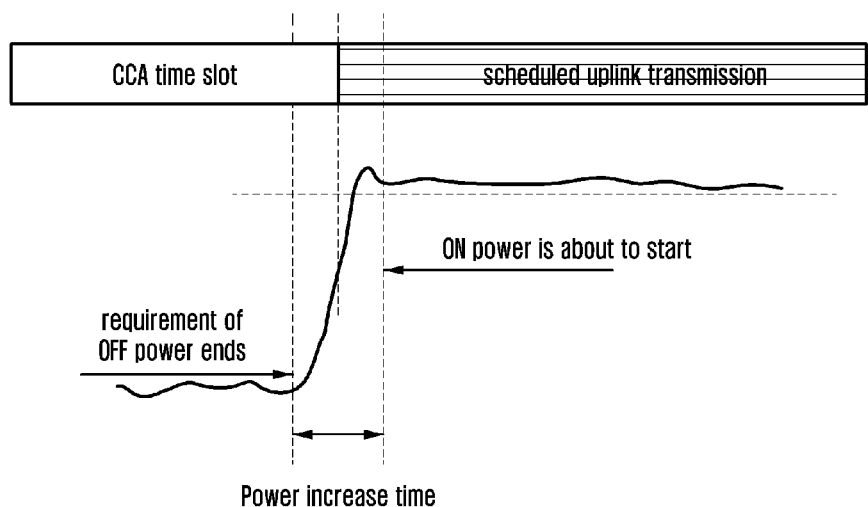
[Fig. 14]
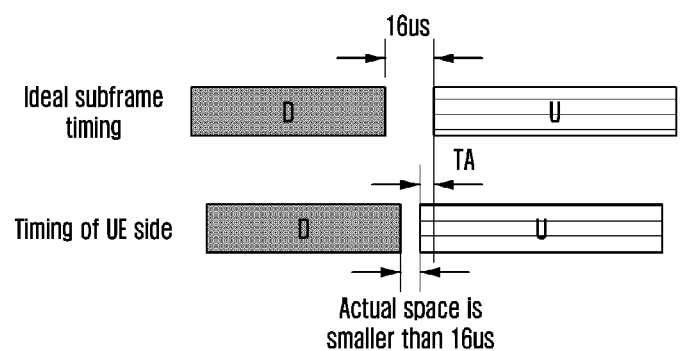

[Fig. 15]
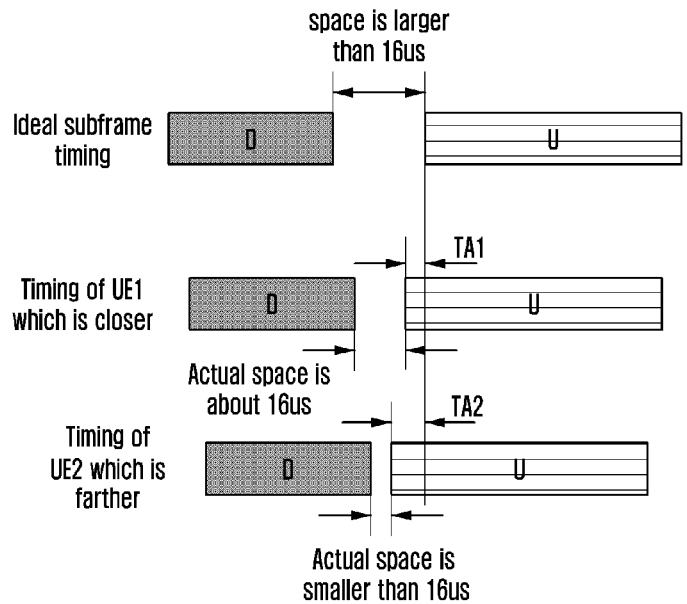
[Fig. 16]
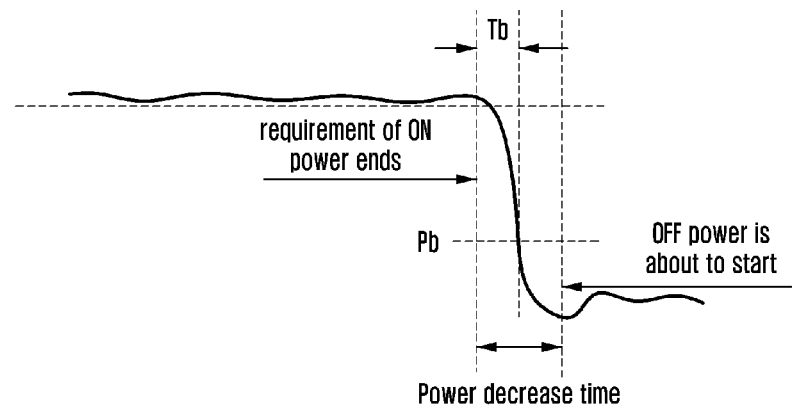
[Fig. 17]
[Fig. 18]

METHOD AND DEVICE FOR TRANSMITTING UPLINK INFORMATION

PRIORITY

This application is a National Phase Entry of PCT International Application No. PCT/KR2017/005025 which was filed on May 15, 2017, and claims priority to Chinese Patent Application Nos. 201610319889.9, 201610324383.7, and 201610652034.8, which were filed on May 13, 2016, May 16, 2016, and Aug. 10, 2016, respectively, the content of each of which is incorporated herein by reference.

TECHNICAL FIELD

The present disclosure relates to wireless communication technologies, in particular to a method and device for transmitting uplink information on an unlicensed band.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A Long Term Evolution (LTE) system of a standard organization of 3rd Generation Partnership Project (3GPP) supports three types of frame structures, which includes Frequency Division Duplex (FDD) and Time Division Duplex (TDD). FDD and TDD are deployed on a licensed band generally. Further, a third frame structure is used on an unlicensed band, which coexists with other wireless access technologies based on the technology of 'listen before talk' (LBT) transmission, that is detection before transmission. For the three types of frame structures, a wireless frame with a length of 10 ms is configured and it is equally divided into 10 sub-frames with a length of 1 ms. Wherein, a sub-frame consists of two consecutive time slots each with a length of 0.5 ms. That is, the kth sub-frame includes time slot 2 k and time slot 2 k+1, wherein k equals to 0, 1, . . . 9. FIG. 1 shows a frame structure of a TDD system. Each wireless frame is divided into two half-frames with a length of 5 ms. Each half-frame includes 8 time slots each with a length of 0.5 ms and 3 special fields, i.e., a downlink pilot time slot (DwPTS), a guard period (GP) and an uplink pilot time slot (UpPTS). And the total length of these special fields is 1 ms. For the third frame structure, a partial sub-frame structure is also supported, that is, a start part of the sub-frame is used for downlink transmission, which is equivalent to DwPTS. One downlink transmission time interval (TTI) is defined on one sub-frame.

In the LTE system, a wider working bandwidth may be obtained by adopting carrier aggregation (CA) technology, wherein one cell is Primary Cell (Pcell), and other cells are secondary Cells (Scells). The third frame structure deployed on the unlicensed band may be configured to be Scell, that is, the cell in another licensed band is configured to be Pcell.

In the LTE system, for the uplink data transmission, an uplink grant signaling (UL-Grant) sent in downlink sub-frame n is to schedule data transmission in uplink sub-frame n+k. In an FDD system, k may equal to 4. In a TDD system, due to limitations of the frame structure, k may be larger than or equal to 4. For the third frame structure, according to the discussion progress of the current standardized conference, a timing relationship between the UL-Grant and uplink data scheduled by the UL-Grant may be dynamic, but its time delay still needs to be larger than or equal to 4.

According to the existing LTE specifications, when there is no Physical Uplink Control Channel (PUCCH) transmission, a transmission power of the physical uplink shared channel (PUSCH) in sub-frame i of a cell c may be determined according to the following formula:

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm], wherein, each parameter in the above formula is defined in section 5.1.1.1 of 36.212 of the 3GPP specification in detail. And these parameters are briefly introduced as follows: $P_{CMAX,c}(i)$ refers to a maximum transmission power of a UE configured in cell c; $M_{PUSCH,c}(i)$ refers to the number of PRBs occupied by the PUSCH; $P_{O\_PUSCH,c}(j)$ refers to a power offset configured by a higher layer signaling; $PL_c$ refers to a link loss; $\alpha_c(j)$ refers to all or part of a control compensation link loss; $f_c(i)$ refers to an accumulated value controlled by closed loop power; and $\Delta_{TF,c}(i)$ refers to a parameter related to MCS of an uplink transmission. Specifically speaking, when parameter $K_s$ equals to 1.25, $\Delta_{TF,c}(i)=10\log_{10}((2^{BPRE \cdot K_s}-1) \cdot \beta_{offset}^{PUSCH})$. For a case in which only A-CSI is sent and uplink data are not sent, $BPRE=O_{CQI}/N_{RE}, \beta_{offset}^{PUSCH}=\beta_{offset}^{CQI}$. For a case in which the uplink data are sent, $$BPRE = \sum_{r=0}^{C-1} K_r / N_{RE}, \beta_{offset}^{PUSCH} = 1.$$

C refers to the number of CBs divided by one TB; $K_s$ refers to the number of bits of the rth CB and $N_{RE}$ refers to the total number of REs included in the PUSCH channel.

According to the discussion progress of the current standardized conference, on a carrier of the unlicensed band, the allocation granularity of the uplink PUSCH channel of the UE is one interlace. For example, as shown in FIG. 2, one interlace includes 10 PRBs, and they are distributed on the whole bandwidth at equal intervals, that is, the interval is 10 PRBs. When such PUSCH resource allocation structure is adopted, in one aspect, uplink energy of LAA is distributed on the whole system bandwidth; in the other aspect, under a premise of meeting a certain Power Spectral Density (PSD), the transmission power of the UE in one PRB may be improved, thus in a case that only one interlace is allocated by the UE, uplink transmission may still be performed with a higher power. Herein, in a case of increasing the transmission power of the UE, the problem to be solved is how to ensure friendly coexistence with other devices.

In fact, power adjustments of devices need a transition time. For example, when a device without data transmission strats a data transmission, the transmission power of the device would increase from a very low value or 0, such as an OFF power, to a transmission power, which would not be stable in a set power, such as an ON power, till a certain transition time has lapsed. The certain transition time may be named as a power increase transition time hereinafter. Accordingly, when the transmission power of the device decreases from a higher value, such as an ON power to a transmission power, which would not be stable in a very small power value or power value 0, such as an OFF value, till a certain transition time has lapsed. The certain transition time would be named as power decrease transition time hereinafter. According to the existing LTE specifications, as shown in FIG. 3, for uplink data transmission, the power increase transition time of the UE may be 20 us after the start time of uplink transmission scheduled by a base station; and the power decrease transition time of the UE may be 20 us after the end time of uplink transmission scheduled by the base station. According to the existing LTE specifications, as shown in FIGS. 4 and 5, for a PRACH and an SRS, the power increase transition time of the UE may be 20 us before start time of the PRACH and the SRS; and the power decrease transition time of the UE may be 20 us after end time of the PRACH and the SRS. According to 3GPP RAN4 specifications, there are no demands on an instantaneous value of the transmission power of the device in the transition time. However, the transmission power of the device is required to reach a required value after the transition time.

According to the discussion progress of the current standardized conference, multiple LBT solutions for uplink transmission may exist. One solution is LBT type 4 (CAT-4). That is, the device may generate a random number N according the size of a certain contention window (CW). Then the channel may only be occupied when the number of idle channels reaches N. Herein, the device may instantly send a filling signal occupying the channel till a start timing of the uplink transmission scheduled, and then starts the uplink transmission scheduled. Or, the device may execute a Self-Defer process, and start the scheduled uplink transmission only when the channel is detected to be idle for a length of time T0 before the start timing of the uplink transmission scheduled. For example, T0 may equal to 25 us, Another solution is LBT type 2 (CAT-2). That is, the device may occupy the channel as long as the device detects that the channel is idle for a length of time T1 before the start timing of the uplink transmission scheduled. For example, T1 may equal to 25 us. The basic principle of the LBT mechanisms is to avoid collision from other devices by detecting whether a CCA time slot is idle. In addition, the LBT solution may be NO LBT. That is, the device may start an uplink transmission directly without executing LBT after deferring a time period no longer than T3 from the end of a downlink transmission. For example, T3 may equal to 16 us, which is consistent with the short inter-frame space (SIFS) of WiFi. NO LBT may be considered that the LBT must be successful after the time of T3.

DISCLOSURE OF INVENTION

Technical Problem

When one device finishes the LBT successfully, the device may start transmission, and the transmission power of the device needs to be quickly adjusted to a certain value so as to prevent the channel being occupied by other devices. But this requirement contradicts to the requirement that no limitation should be put to the instantaneous power in the power increase transition time of the UE. Therefore, how to process the LBT and the power increase transition time is an urgent problem to be solved.

Solution to Problem

The present disclosure provides a method, a device and a base station for transmitting uplink information, and also provides an LBT-based channel contention method, which may reasonably adjust uplink transmission power of the UE, such that coexistence with other systems in an unlicensed band may be ensured.

To realize the above aims, the present disclosure adopts the following technical solutions:

A method for transmitting uplink information includes:

detecting, by a user equipment (UE), a control signaling UL-Grant for scheduling uplink data transmission from a base station;

determining, by the UE, a maximum transmission power allowed in a sub-frame according to control information of the UL-Grant, and determining an uplink transmission power of the UE;

executing, by the UE, listen before talk (LBT) according to the UL-Grant, and performing an uplink data transmission according to the uplink transmission power determined after the LBT is successful.

In some examples, the determining the maximum transmission power allowed in the current sub-frame, and determining an uplink transmission power of the UE includes:

determining, according to a power offset $P_{O,c}$, the maximum transmission power allowed by $P_{CMAX,c}(i)+P_{O,c}$; and determining the uplink transmission power in a sub-frame i in a cell c according to the following formula, $$P_{PUSCH,c}(i) = \min \begin{Bmatrix} P_{CMAX,c}(i) + P_{O,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

wherein, $M_{PUSCH,c}(i)$ is the number of PRBs occupied by a PUSCH; $P_{O\_PUSCH,c}(j)$ is a power offset configured by a higher layer signaling; $PL_c$ is a link loss; $\alpha_c(j)$ is all or a part of a control compensation link loss; $f_c(i)$ is an accumulated value controlled by closed loop power; and $\Delta_{TF,c}(i)$ is a parameter related to MCS of uplink transmission.

In some example, the determining the maximum transmission power allowed in the current sub-frame, and determining an uplink transmission power of the UE includes:

determining, according to control information of the UL-Grant, the maximum transmission power allowed as $P_{m,UE,c}(i)$; and determining the uplink transmission power in a sub-frame i of a cell c according to the following formula, $$P_{PUSCH,c}(i) = \min \begin{Bmatrix} P_{CMAX,c}(i), \\ P_{m,UE,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm]

wherein, $P_{CMAX,c}(i)$ is the maximum transmission power configured to the UE in cell c; $M_{PUSCH,c}(i)$ is the number of PRBs occupied by a PUSCH; $P_{O\_PUSCH,c}(j)$ is a power offset configured by a higher layer signaling; $PL_c$ is a link loss; $\alpha_c(j)$ is all or a part of a control compensation link loss; $f_c(i)$ is an accumulated value controlled by closed loop power; and $\Delta_{TF,c}(i)$ is a parameter related to MCS of uplink transmission.

In some examples, the determining the maximum transmission power allowed in the current sub-frame, and determining an uplink transmission power of the UE comprises:

determining, by the UE, according to control information of the UL-Grant, the uplink transmission power $P_{PUSCH,c}(i)$ in sub-frame i of a cell c and the maximum $D_{m,UE,c}(i)$ of the UE; and transmitting, by the UE, uplink signals according to the uplink transmission power $P_{PUSCH,c}(i)$ when the PSD of the uplink transmission using $P_{PUSCH,c}(i)$ is smaller than or equals to $D_{m,UE,c}(i)$; and otherwise, reducing, by the UE, the uplink transmission power till the PSD of the uplink transmission is smaller than or equals to $D_{m,UE,c}(i)$.

In some examples, the performing an uplink data transmission according to the uplink transmission power determined after the LBT is successful includes:

increasing the transmission power to a certain strength Pa in a time period of Ta after power increase transition time starts, wherein Ta and Pa are selected so that the channel is detected as busy by other devices nearby after the power increase transition time of a device starts.

In some examples, the performing an uplink data transmission according to the uplink transmission power determined after the LBT is successful includes at least one of the following:

for CAT2 and CAT4, starting a power increase transition time following the last CCA time slot of the LBT operation immediately; or for NO LBT, deferring T3us after the ending of a downlink transmission, taking the moment as the start timing of a power increase transition time of the UE, wherein T3 is the length of the deferred time.

In some examples, the LBT comprises:

for CAT4, occupying, by the UE, the channel only when CAT4 detection is finished before moment t; for CAT2, occupying, by the UE, the channel only when the channel is detected as idle for T1us before the moment t; for NO LBT, the length of period between the moment t and the ending of a downlink transmission is T3us, wherein the start timing of the uplink transmission scheduled by a base station is t; or for CAT4, occupying, by the UE, the channel only when CAT4 detection is finished before moment t−Tt; for CAT2, occupying, by the UE, the channel only when the channel is detected as idle for T1us before the moment t−Tt; for NO LBT, the length of period between the moment t−Tt and the ending of a downlink transmission is T3us, wherein the start timing of the uplink transmission scheduled by a base station is t, and the power increase transition time of the UE is Tt.

In some examples, the performing an uplink data transmission according to the uplink transmission power determined after the LBT is successful comprises at least one of the following:

for CAT2 and CAT4, the last CCA time slot of the LBT of the UE comprising a power increase transition time of the UE; or for NO LBT, a later part of the T3us time period after the ending of a downlink transmission comprising a power increase transition time of the UE.

In some examples, the performing an uplink data transmission according to the uplink transmission power determined after the LBT is successful comprises at least one of the following:

for CAT2 and CAT4, the last CCA time slot of the LBT of the UE comprising a first part of a power increase transition time of the UE; or for NO LBT, the later part of the T3us time period after the ending of a downlink transmission comprising a first part of the power increase transition time of the UE.

In some examples, the LBT comprises:

for CAT4, occupying, by the UE, the channel only when CAT4 detection is finished before moment t−Tr; for CAT2, occupying, by the UE, the channel only when the channel is detected as idle for T1us before the moment t−Tr; for NO LBT, occupying, by the UE, the channel after a time period of T3us from the ending of a downlink transmission, wherein the start timing of the uplink transmission scheduled by a base station is t, and a residual time of the power increase transition time between the LBT ending moment and the start timing of the uplink transmission scheduled by the base station is Tr; or for CAT4, occupying, by the UE, the channel only when CAT4 detection is finished before moment t; for CAT2, occupying, by the UE, the channel only when the channel is detected as idle for T1us before the moment t; for NO LBT, occupying, by the UE, the channel after a time period of T3us from the ending of the downlink transmission, wherein the start timing of the uplink transmission scheduled by a base station is t, a last part of a power increase transition time of the UE is the moment t.

In some examples, the performing an uplink data transmission comprises:

in a time period of Tb after the starting of a power decrease transition time, reducing a transmission power to be below a certain strength Pb, wherein Tb and Pb are selected so that other devices nearby detect the channel as idle after the power decrease transition time of one device starts.

In some examples, the performing an uplink data transmission according to the uplink transmission power determined after the LBT is successful comprises:

at T1+x us after the start timing of OFDM symbol 0 of a sub-frame, performing, by the UE, an uplink data transmission according to the uplink transmission power determined, wherein T1 is a channel idle time required by CAT2, and x is a predetermined value or a value configured by a higher layer signaling; or at T1+TA+z us after the start timing of OFDM symbol 0 of a sub-frame, performing, by the UE, an uplink data transmission according to the uplink transmission power determined, wherein T1 is a channel idle time required by CAT2, TA is a time advancement of the UE, and z is a predetermined value or a value configured by a higher layer signaling.

A base station includes: a scheduling module and a transceiving module, wherein the scheduling module is to allocate uplink resources occupied by UEs, determine an LBT mechanism, and determine a transmission power allowed by the UEs according to a total uplink resources occupied by all the UEs scheduled in the current sub-frame; and the transceiving module is to send a scheduling signaling to the UEs, indicate the UEs to perform uplink and downlink transmission and correspondingly send downlink data and receive uplink data.

A UE includes: a scheduling analyzing module and a transceiving module, wherein the scheduling analyzing module is to analyze a scheduling signaling from a base station, determine uplink and downlink resources allocated by the base station, determine an LBT mechanism and related parameters adopted by the base station for configuring uplink transmission and determine a maximum transmission power allowed; and the transceiving module is to receive the scheduling signaling from the base station, receive downlink data, execute uplink LBT and send uplink data when the LBT is successful.

Advantageous Effects of Invention

By adopting the method of the present disclosure, the total uplink transmission power of an entire cell in one sub-frame can be controlled, so as to realize coexistence with other devices, and by reasonably setting an LBT time period and a power increase conversion time, the probability of collisions among devices can be reduced.

BRIEF DESCRIPTION OF DRAWINGS

FIG. 1 is a schematic diagram illustrating a frame structure of an existing TDD system;

FIG. 2 is a schematic diagram illustrating PUSCH resource allocation based on interlaces;

FIG. 3 is a schematic diagram illustrating a power transition time of a PUSCH according to existing LTE specifications;

FIG. 4 is a schematic diagram illustrating a power transition time of a PRACH according to existing LTE specifications;

FIG. 5 is a schematic diagram illustrating a power transition time of an SRS according to existing LTE specifications;

FIG. 6 is a flow chart illustrating the process of performing process on LBT and uplink transmission power according to some examples of the present disclosure;

FIG. 7 is a schematic diagram illustrating a power increase transition time;

FIG. 8 is a schematic diagram illustrating a power increase transition time immediately following an LBT time period;

FIG. 9 is a schematic diagram illustrating a power increase transition time immediately following an LBT time period;

FIG. 10 is a schematic diagram illustrating a power increase transition time immediately following an LBT time period;

FIG. 11 is a schematic diagram illustrating a power increase transition time being in an LBT time period;

FIG. 12 is a schematic diagram illustrating a part of the power increase transition time being in an LBT time period;

FIG. 13 is a schematic diagram illustrating a part of the power increase transition time being in an LBT time period;

FIG. 14 is a schematic diagram illustrating NO LBT operation;

FIG. 15 is a schematic diagram illustrating NO LBT operation;

FIG. 16 is a schematic diagram illustrating a power decrease transition time;

FIG. 17 is a schematic diagram illustrating the structure of a base station device of the present disclosure; and FIG. 18 is a schematic diagram illustrating the structure of a UE device of the present disclosure.

MODE FOR THE INVENTION

In order to make the object, technical solution and merits of the present disclosure clearer, the present disclosure is further illustrated in detail hereinafter with reference to the accompanying drawings and detailed examples.

On a carrier of an unlicensed band, the device contends for a channel based on an LBT mechanism. And the candidate LBT mechanisms may include CAT4, CAT2 and NO LBT. When the device finishes an LBT successfully, the device may occupy the channel to transmit data. Signals transmitted by the device must meet a series of requirements. For example, the transmission power is required to be smaller than a maximum transmission power allowed in a frequency band, the PSD of the transmitted signal is required to be smaller than a maximum PSD allowed in the frequency band, and the bandwidth of the transmission channel is required to be larger than or equal to 80% of the channel bandwidth.

FIG. 6 is a flow chart illustrating the process of processing LBT and uplink transmission power according to some examples of the present disclosure.

Step 601: UE detects control information, i.e., UL-Grant, for scheduling uplink data transmissions from a base station.

The UL-Grant includes control information of the uplink data transmission scheduled for the UE. For example, the UL-Grant includes a PRB set allocated, MCS, and the like. The UL-Grant may also indicate an LBT mechanism required to be executed by the UE.

Step 602: the UE determines PRB resources allocated by the base station and other information according to the UL-Grant, determines a maximum transmission power allowed in the current sub-frame, and determines an uplink transmission power of the UE.

Herein, the uplink transmission power of the UE is limited by the maximum transmission power and the maximum PSD in the band. Considering that on one carrier, the base station may schedule multiple UEs, thus a total transmission power of the multiple UEs needs to be further limited to avoid the total uplink transmission power on one sub-frame being overhigh when viewed from the cell as a whole. And it is favorable for coexistence with other devices.

Step 603: the UE works according to an LBT mechanism configured by the UL-Grant and starts uplink data transmission after the LBT is successful.

Herein, because power transition times exist in both the start and end positions of a signal transmitted by the device, an influence of the power transition times on LBT is also required to be considered.

The present disclosure is illustrated in detail hereinafter in combination with specific examples.

A First Example

On one carrier of an unlicensed band, an allocation granularity of an uplink PUSCH channel of the UE is one interlace. One interlace contains multiple PRBs, and these PRBs are dispersed on the whole band. For example, FIG. 2 shows that it is assumed that one interlace includes 10 PRBs which are distributed at equal intervals on the whole band of 20 MHz. The uplink PUSCH of the UE needs to meet the requirements of a maximum transmission power in one aspect and needs to meet the limitation of the PSD in the other aspect. The PUSCH resource allocation structure based on interlaces may be adopted relaying on a definition method of the frequency granularity of the PSD. When the frequency granularity is large, for example, 1 MHz, the allowed maximum transmission power of the UE may be increased. For example, it is assumed that the frequency granularity of the PSD is 1 MHz and the limitation of the PSD is 10 dBm/MHz, the transmission power on one PRB of one interlace may reach 10 dBm, thus the maximum transmission power of the UE on one interlace may reach 20 dBm.

By adopting the above PSD calculating method, the maximum transmission power of the UE during allocation of one interlace is increased, but when the base station schedules a plurality of UEs in one sub-frame, the total transmission power in this sub-frame is also increased viewed from the cell as a whole. For example, the base station schedules 10 UEs, the total transmission power may reach 30 dBm. For coexistence, the total uplink transmission power of the whole cell in the sub-frame needs to be limited. And a processing method of the present disclosure is described below.

According to the analysis above, in one sub-frame, when the base station executes multi-user scheduling, in order to control the total transmission power of the whole cell in one sub-frame and realize coexistence with other devices, the maximum transmission power of one UE should be additionally limited.

Considering the multi-user scheduling in one sub-frame, a first method for controlling the maximum transmission power of the UE is to introduce a power offset $P_{O,c}(i)$ relative to the maximum transmission power $P_{CMAX,c}(i)$ of the UE. In this way, in one sub-frame, the maximum transmission power of the UE may reach $P_{CMAX,c}(i)+P_{O,c}(i)$. Thus, the transmission power of the UE may be calculated through the following formula, i.e., $$P_{PUSCH,c}(i) = \min \left\{ \begin{array}{l} P_{CMAX,c}(i) + P_{O,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

[dBm]

A first method for determining $P_{O,c}(i)$ is that the UL-Grant scheduling an uplink transmission of the UE includes a field for indicating the power offset $P_{O,c}(i)$. Such that the base station may dynamically adjust the allowed maximum transmission power of the UE, and the flexibility of scheduling may be improved.

A second method for determining is $P_{O,c}(i)$ is that the UL-Grant scheduling UE uplink transmission indicates a reference value L. And the power offset $P_{O,c}(i)$ is a function of L, that is, $P_{O,c}(i)=f(L)$. L may be the total number of interlaces of all UEs scheduled by the base station in the current sub-frame. Or, L may be set by the base station according to the number of interlaces scheduled for the multiple UEs. But the L should not be limited to being equal to the total number of interlaces of all UEs scheduled in the current sub-frame. Or, L may be the total number of PRBs of all UEs scheduled by the base station in the current sub-frame. Or L may be set according to the number of PRBs scheduled for the multiple UEs. But L should not be limited to being equal to the total number of PRBs of all UEs scheduled by the base station in the current sub-frame. For example, when the base station schedules multiple UEs and some of UEs have lower powers, the base station may set L as a lager value for other UEs to increase the allowed maximum transmission power. For example, a primer C may be introduced. C is a value configured by a higher layer signaling, or a predetermined constant. Wherein $P_{O,c}(i)=C \cdot (L-L_{max})$. And the range of L is from 1 to $L_{max}$. For example, it is assumed that the system bandwidth is divided into 10 interlaces, the reference value L represents a total number of interlaces scheduled in the current sub-frame, then $L_{max}$ may equal to 10. By adopting this method, the base station may dynamically adjust the allowed maximum transmission power of the UE, and the flexibility of scheduling may be improved.

A third method is that some information fields of the UL-Grant for scheduling a UE may be reused to calculate the power offset $P_{O,c}(i)$. For example, the method may be based on the number of PRBs N of the UEs scheduled. Assuming that a total number of PRBs of the system bandwidth be set as $N_{PRB}$, a primer $C_1$ may be introduced.

$C_1$ is a value configured by a higher layer signaling, or a predetermined constant. And $P_{O,c}(i)=C_1 \cdot (N-N_{PRB})$. For example, the method may be based on the number of interlaces M of the UE scheduled. And assuming the total number of interlaces of the system bandwidth be set as $M_{max}$, a primer $C_2$ may max 2 be introduced. $C_2$ is a value configured by a higher layer signaling, or a predetermined constant. And $P_{O,c}(i)=C_2 \cdot (M-M_{max})$. By adopting this method, overhead of UL-Grant is not increased. However, the flexibility of scheduling is relatively smaller.

Or, considering multi-user scheduling in one sub-frame, a second method for controlling the maximum transmission power of the UE is to introduce the allowed $P_{m,UE,c}(i)$ of one UE in case of multi-user scheduling. $P_{m,UE,c}(i)$ may be the maximum transmission power independent from UE. According to the power control method of an LTE system, a required transmission power may be calculated according to the scheduling of the base station and a TPC command. That is, $10 \log_{10}(M_{PUSCH,c}(i))+P_{O\_PUSCH,c}(j)+\alpha_c(j) \cdot PL_c + \Delta_{TF,c}(i)+f_c(i)$. And the transmission power of the UE needs to be smaller than or equal to the maximum transmission power $P_{CMAX,c}(i)$. Besides, according to the analysis and description above, the transmission power of the UE also needs to meet the limitation caused by multi-use scheduling in one sub-frame. That is, the transmission power of the UE needs to be smaller than or equal to $P_{m,UE,c}(i)$. Thus, the transmission power of the UE may be calculated according to the formula as follows.

$$P_{PUSCH,c}(i) = \min \begin{cases} P_{CMAX,c}(i), \\ P_{m,UE,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm]

A first method for determining $P_{m,UE,c}(i)$ is that the UL-Grant scheduling UE uplink transmission includes indication information, which is used for controlling the transmission power and PSD of the UE. By adopting this method, a method for the base station to dynamically control the total transmission power of each UE scheduled in one sub-frame is provided, and thus the flexibility of scheduling is improved.

The information controlling the transmission power and PSD may be a reference value L. L may be the total number of interlaces of all UEs scheduled by the base station in the current sub-frame. Or, L may be set by the base station according to the number of interlaces of the multiple UEs scheduled. But L should not be limited to being equal to the total number of interlaces scheduled by the base station in the current sub-frame. Or L may be the total number of PRBs of all UEs scheduled by the base station in the current sub-frame. Or, L may be set by the base station according to the number of PRBs of the multiple UEs scheduled. But L should not be limited to equaling to the total number of PRBs of all UEs scheduled by the base station in the current sub-frame. For example, when the base station schedules multiple UEs and some of the UEs have lower powers, the base station may increase the allowed maximum transmission power $P_{m,UE,c}(i)$ of other UEs by setting L as a small $P_{m,UE,c}(i)$ according to L is described below. It is assumed that the maximum transmission power of one device allowed by a national/regional regulation is $P_m$, and the maximum total transmission power of multiple UEs allowed in one sub-frame is $C \cdot P_m$. Wherein, C is a value configured by a higher layer signaling, or a predetermined constant. For example, C equals to 1. Then the total uplink transmission power of all UEs in one sub-frame may be enabled to be smaller than or equal to $P_m$. According to the reference value L and the maximum $C \cdot P_m$ of the above total transmission power, the maximum transmission power allowed by one device may be controlled. For example, the reference value L is the total number of interlaces scheduled currently. And assuming that the above maximum of the total transmission power $C \cdot P_m$ is allocated to L interlaces scheduled currently on average, the maximum transmission power allowed by one interlace is $C \cdot P_m/L$. Thus, assuming that the number of interlaces allocated for one UE is $L_{UE}$, the maximum transmission power $P_{m,UE,c}(i)$ allowed by this UE may be obtained by, for example, $P_{m,UE,c}(i)=C \cdot P_m \cdot L_{UE}/L$.

A second method is to configure a maximum transmission power of the UE on one PRB or to configure a maximum value of the total transmission power of the UE on all PRBs of one interlace, thus the total transmission power of UEs in the whole cell may be limited in one sub-frame. For example, a total transmission power of a PRB is limited to $P_{m,PRB,c}$, and UE schedules N PRBs, then the allowed maximum transmission power of the UE is $P_{m,UE,c}(i)=N \cdot P_{m,PRB,c}$. The maximum transmission power $P_{m,PRB,c}$ of one PRB above may be configured by a higher layer signaling or predetermined. For example, the maximum value of the total transmission power of all PRB s on one interlace is limited to $P_{m,Interlace,c}$, and UE schedules M interlaces, then the allowed maximum transmission power of the UE is $P_{m,UE,c}(i)=M \cdot P_{m,Interlace,c}$. The $P_{m,Interlace,c}$ of the total transmission power of all PRBs on one interlace may be configured by a higher layer signaling or predetermined. By adopting this method, overhead of the UL-Grant is not increased. But the flexibility of scheduling is relatively small.

Considering multi-user scheduling in one sub-frame, a third method for controlling the maximum transmission power of the UE is that controlling over the uplink transmission PSD is further introduced based on the power control method of the existing LTE system. Specifically speaking, in case of multi-user scheduling, the allowed maximum PSD of one UE is obtained according to the information of the uplink transmission UL-Grant for scheduling UEs, which is labeled as $D_{m,UE,c}(i) \cdot D_{m,UE,c}(i)$ may be smaller than or equal to the allowed maximum PSD of an unlicensed band, which is labeled as $D_m$. Thus, in one aspect, the transmission power of the UE in one sub-frame may be calculated according to the formula (formula A) as follows according to the LTE method.

$$P_{PUSCH,c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases}$$

[dBm]:

In the other aspect, the uplink transmission PSD of the UE should be smaller than or equal to $D_{m,UE,c}(i)$. Specifically speaking, if the uplink transmission PSD of the uplink transmission power in one sub-frame calculated according to the formula A is smaller than or equals to $D_{m,UE,c}(i)$, the UE may send an uplink signal according to the uplink transmission power calculated according to the formula A. Otherwise, the UE needs to reduce the uplink transmission power till the uplink transmission PSD is smaller than or equals to $D_{m,UE,c}(i)$.

A first method for determining $D_{m,UE,c}(i)$ is that the UL-Grant for scheduling uplink transmissions of the UE includes a field indicating a deviation $D_{O,c}(i)$ of the allowed maximum PSD of the UE relative to $D_m$. That is, $D_{m,UE,c}(i)=D_m \cdot D_{O,c}(i)$. And $D_{O,c}(i)$ may be smaller than or equal to 0. Therefore, the base station may dynamically adjust the allowed uplink transmission PSD of the UE, and further adjusts the allowed maximum transmission power of the UE. Thus the flexibility of scheduling is improved.

A second method for determining $D_{m,UE,c}(i)$ is that the UL-Grant for scheduling uplink transmissions of the UE indicates a reference value L. And $D_{m,UE,c}(i)$ is a function of L. That is, $D_{m,UE,c}(i)=f(L)$. For example, L may be the total number of interlaces of all UEs scheduled by the base station in the current sub-frame. Or, L may be set by the base station according to the number of interlaces scheduled for the multiple UEs. But, the L may not be limited to equaling to the total number of interlaces of all UEs scheduled in the current sub-frame. Or, L may be a total number of the PRBs of all UEs scheduled by the base station in the current sub-frame. Or, L may be set by the base station according to the number of PRBs scheduled for the multiple UEs. But the L may not be limited to equaling to the total number of PRBs of all UEs scheduled by the base station in the current sub-frame. For example, a primer C may be introduced. C is a value configured by a higher layer signaling or a predetermined constant. Wherein, $D_{m,UE,c}(i)=D_m+C \cdot (L-L_{max})$. And the range of L is from 1 to $L_{max}$. For example, it is assumed that the system bandwidth is divided into 10 interlaces, and the reference value $L_{max}$ represents the total number of interlaces scheduled in the current sub-frame, then may equal to 10. For example, when the base station schedules multiple UEs and some of the UEs has lower powers, the base station may set L as a lager value for other UEs to increase the allowed maximum PSD and the allowed maximum transmission power. By adopting this method, the base station may dynamically adjust the allowed PSD and maximum transmission power. And thus the flexibility of scheduling is improved.

A third method is that some information fields of the UL-Grant for scheduling UEs are reused to obtain $D_{m,UE,c}(i)$ by calculation. For example, the method may be based on the number of PRBs N scheduled for the UE. In this method, the total number of PRBs of the system bandwidth may be set as $N_{PRB}$. And a primer $C_1$ may be introduced. Wherein, $C_1$ is a value configured by a higher layer signaling, or a predetermined constant. And $D_{m,UE,c}(i)=D_m+C_1 \cdot (N-N_{PRB})$. For example, the method may be based on the number of interlaces M scheduled for the UE. In this method, the total of interlaces of the system bandwidth may be set as $M_{max}$. And a primer, $C_2$ may be introduced, and $C_2$ is a value configured by a higher layer signaling, or a predetermined constant. And $D_{m,UE,c}(i)=D_m+C_2 \cdot (M-M_{max})$. By adopting this method, overhead of the UL-Grant is not increased. However the flexibility of scheduling is relatively small.

A Second Example

Due to limitations of the device, the transition time during power adjusting of the device always exists in actual working environments. And the transition time includes a power increase transition time and a power decrease transition time. In the existing LTE systems, positions of the power increase transition time of different types of signals relative to a sub-frame/OFDM signal are different. That is, for a PUSCH, the power increase transition time of the UE is 20 us after the start time of the uplink transmission scheduled by the base station; for a PRACH and an SRS, the power increase transition time of the UE is 20 us before the start time of the PRACH and the SRS. According to the 3GPP RAN4 specifications, there are no requirements on the instantaneous value of the transmission power of the device in the transition time. However the transmission power of the device is required to reach a required value after the transition time.

On a carrier of an unlicensed band, the UE contends for a channel by executing LBT, and starts an uplink transmission after completing the LBT successfully. The LBT may be CAT2 or CAT4. In addition, the LBT may also be NO LBT. That is, after the downlink transmission, the uplink transmission may be started directly within T3us without the CAA detection. For example, T3 may equal to 16. In this method, it is assumed that the LBT is successful. And the transmission power of the UE needs to reach a certain value quickly to avoid the channel being occupied by other devices. That is, if the power increase transition time is allowed to be 20 us and the value of the power during the 20 us is also not limited, collisions between the UE and other devices may be caused. For example, assuming that the actual transmission power of the UE in the first 9 us of the power increase transition time which is 20 us is low, then the channel may be detected as idle by other UEs or Wi-Fi terminals nearby in the first 9 us time period. As a result, an uplink transmission may be started by one of these terminals, and a collision may be caused.

The power increase transition time of the UE is set as Tt, which may be 20 us, or of other values. For example, Tt is smaller than 20 us, thus the power may be adjusted faster by the device, which is favorable for the LBT mechanism. In order to avoid a collision, as shown in FIG. 7, the transmission power of the UE is required to be increased to a certain strength Pa from an OFF power in the first Ta time after the power increase transition time starts according to the present disclosure. For the time after the moment Ta in the power increase transition time, the transmission power is not required to be stabilized on a target uplink transmission power. But the power during this time period is required to be of a relatively large value. For example, the transmission power after the moment Ta may be larger than or equal to Pa. Pa may be not equal to the target uplink transmission power of the UE. Pa may be an absolute power value, or be determined according to the current target uplink transmission power of the UE. Ta is smaller than or equals to Tt, and Ta is required to be a relatively small value. For example, Ta is far smaller than 9 us. The parameters Ta and Pa above may be configured by a higher layer signaling or predetermined. By setting Ta to be a small value and Pa to be a large value, after the power increase transition time of one device starts, the channel would be detected as busy by other devices nearby. Thus collisions are avoided.

Based on the analysis above, a timing relation between a time period occupied by the uplink LBT and the power increase transition time of the UE needs to be reasonably configured, such that the probability of collisions between terminals may be avoided being increased.

A first method for configuring the timing relation between a time period occupied by the uplink LBT and the power increase transition time of the UE is described below. For CAT2 and CAT4, in the last CCA time slot of the LBT operation of the UE, the transmission power of the UE needs to be maintained below the OFF power. And after the ending of the last CCA time slot, the UE may starts to increase the transmission power according to the scheduling of the base station. That is, the power increase transition time of the UE follows the last CCA time slot immediately. For NO LBT, in the time period with a length of T3us after the ending of the downlink transmission, the transmission power of the UE needs to be maintained below the OFF power. And after the ending of the T3us time period, the UE starts to increase the transmission power according to the scheduling of the base station. That is, the power increase transition time follows the T3us time period immediately.

For some uplink transmissions, such as in a PUSCH, as shown in FIG. 8, since the power increase transition time starts after the start timing of the uplink transmission scheduled by the base station, the UE finishes the LBT before the start timing of the uplink transmission scheduled by the base station, then the UE may start the uplink transmission. The start timing of the uplink transmission scheduled by the base station is labeled as t. For CAT4, the CAT4 detection needs to be finished before the moment t, and only after that moment t the UE may occupy the channel. For CAT2, only when the UE detects the channel to be idle for T1us before the moment t, the UE may occupy the channel. For NO LBT, a time period of T3us between the moment t and the ending of the downlink transmission is required before the UE occupies the channel. For some other cases, such as in a PRACH and an SRS, as shown in FIG. 9, since the power increase transition time ends before the starting time of the uplink transmission scheduled by the base station, the UE needs to finish the LBT before the start timing of the power increase transition time of the uplink transmission scheduled by the base station, and then the UE may start the uplink transmission. It is assumed that the start timing of the uplink transmission scheduled by the base station is labeled as t, and the power increase transition time of the UE is Tt. Then for CAT4, the CAT4 detection needs to be finished before the moment t−Tt, and only after that moment the UE may occupy the channel. For CAT2, only when the UE detects that the channel is idle for T1 us before the moment t−Tt, the UE may occupy the channel. For NO LBT, a time period T3us between the moment t−Tt and the ending of the downlink transmission is required before the UE occupies the channel. The power increase transition time of the UE may be configured by a higher layer signaling or predetermined.

Since an SRS only has one symbol, in order to avoid the influence of the above power increase transition time, in some examples, the power increase transition time ends before the start timing of the SRS symbol, such as the method as shown in FIG. 9. For a PUSCH, the power increase transition time of the UE may be defined to end before the start timing of the scheduled PUSCH, such that the method as shown in FIG. 9 is adopted. In fact, in an uplink LAA system, LBT time may be obtained by knocking out some OFDM symbols. And the time for LBT is reduced to some extent in the method that the power increase transition time ends before the start timing of the scheduled PUSCH. But interferences in the uplink transmission from/to other UEs may be avoided. For a PRACH, the power increase transition time of the UE may be defined to start after the staring timing of the PRACH, such that the method as shown in FIG. 8 is adopted. That the power increase transition time starts after the staring timing of the PRACH is equivalent to reduction of the length of a cyclic prefix (CP) of the PRACH. But since a typical application scenario of LAA is a micro cell, the propagation time delay is not very large. While the CP of a PRACH pilot signal is long, therefore, the method has very small influence on the performance of the PRACH.

For one scheduled uplink transmission, for example, the structure of the power increase transition time as shown in FIG. 7 may be adopted. The power increase transition time of the UE may start before the start timing of the uplink transmission scheduled by the base station, and the power increase transition time may end after the start timing of the uplink transmission scheduled by the base station. Herein, a length of the part of the power increase transition time before the start timing of the uplink transmission scheduled by the base station may be defined as Ta. Besides, before the start timing of the uplink transmission scheduled by the base station, the transmission power of the UE needs to be increased to a certain strength Pa from OFF power. As shown in FIG. 10, the power increase transition time of the UE follows the last CCA time slot immediately. When NO LBT is adopted, the power increase transition time follows the T3 us time period immediately. It is assumed that the start timing of the uplink transmission scheduled by the base station is t. Then for CAT4, the CAT4 detection needs to be finished before t−Ta, and only after that moment the UE may occupy the channel. For CAT2, only when the UE detects the channel has been idle for T1 us before the moment t−Ta, the UE may occupy the channel. For NO LBT, a time period of T3us between the moment t−Ta and ending of the downlink transmission is required before the UE occupies the channel. By adopting the method in FIG. 10, for a PUSCH, a PRACH and an SRS, it should be defined that a first part of the power increase transition time needs to be before the start timing of the uplink transmission scheduled by the base station, and a later part of the power increase transition time needs to be after the start timing of the uplink transmission scheduled by the base station.

A second method for configuring the timing relation between a time period occupied by the uplink LBT and the power increase transition time of the UE is described below. For CAT2 and CAT4, the last CCA time slot of the LBT operation of the UE includes the power increase transition time of the UE. That is, the power increase transition time of the UE starts in a later part of the last CCA time slot, as shown in FIG. 11. Herein, the UE sends an uplink signal in a later part of the last CCA time slot, which does not influence the judgment that the last CCA time slot is an idle time slot. For NO LBT, the later part of the T3us time period after the ending of downlink transmission may include the power increase transition time of the UE. This method requires that the power increase transition time of the UE is very short, and correspondingly, requirements on the device are higher. Assuming that the start timing of the uplink transmission scheduled by the base station is labeled as t, the power increase transition time of the UE may end before the moment t. For CAT4, the CAT4 detection needs to be finished before the moment t, and only after that moment the UE may occupy the channel. For CAT2, only when the UE detects the channel has been idle for T1 us before the moment t, the UE may occupy the channel. For NO LBT, a time period of T3us between the moment t and the ending of a downlink transmission is required before the UE occupies the channel. The method in FIG. 11 may be used for processing a PRACH and an SRS. For a PUSCH, if the method as shown in FIG. 11 is used, the power increase transition time of the UE needs to end before the start timing of the scheduled PUSCH.

A third method for configuring the timing relation between a CCA time slot of the uplink LBT and the power increase transition time of the UE is described below. For CAT2 and CAT4, the last CCA time slot of the LBT operation of the UE includes the first part of the power increase transition time of the UE. That is, the power increase transition time of the UE is overlapped in part with the last CCA time slot. Herein, the UE may send an uplink signal in a later part of the last CCA time slot, which does not influence the judgment that the last CCA time slot is the idle time slot. For NO LBT, the later part of the T3us time period after the ending of a downlink transmission may include a first part of the power increase transition time of the UE. That is, the power increase transition time of the UE is overlapped in part with the T3us time period. The length of the first part of the power increase transition time may be configured by a higher layer signaling or predetermined. In this method, the power is also allowed to be adjusted after the ending of the last CCA time slot or after the ending of the time period of T3us, therefore the requirements on the device are lower. Particularly, after the ending of the last CCA time slot or after the ending of the T3us time period, although not stable yet, the transmission power of the UE may reach a certain strength, such that CCA detection of other devices may be stopped, and the probability of collisions may be reduced.

As shown in FIG. 12, by adopting this method, there is still a residual part of power increase transition time between the start timing of the uplink transmission scheduled by the base station and the ending moment of LBT. The length of this residual part of power increase transition time is labeled as Tr. And the start timing of the uplink transmission scheduled by the base station is labeled as t. Then for CAT4, the CAT4 detection needs to be finished before moment t−Tr, and only after that moment, the UE may occupy the channel. For CAT2, only when the UE detects that the channel has been idle for T1us before the moment t−Tr, the UE may occupy the channel. For NO LBT, a time period of T3us between the moment t−Tr and the ending of downlink transmission is required before the UE occupies the channel. The residual part Tr of the power increase transition time may be configured by a higher layer signaling or predetermined. The method in FIG. 12 may be used for a PRACH and an SRS. For a PUSCH, if the method as shown in FIG. 12 is used, the power increase transition time of the UE needs to end before the start timing of the scheduled PUSCH.

As shown in FIG. 13, by adopting this method, the UE is required to finish the LBT before the start timing of the uplink transmission scheduled by the base station, and then the UE may start the uplink transmission. At this point, for a scheduled uplink signal, the UE is defined to increase transmission power before the start timing of the scheduled uplink signal, and the power increase transition time may extend to a time after the start timing of the scheduled uplink signal. It is assumed the start timing scheduled by the base station is labeled as t. For CAT4, the CAT4 detection needs to be finished before moment t, and only after that moment the UE may occupy the channel. For CAT2, only when the UE detects the channel has been idle for T1 us before the moment t, the UE may occupy the channel. For NO LBT, a time period T3us between the moment t and the ending of a downlink transmission is required before the UE may occupies the channel. By adopting the method of FIG. 13, for a PUSCH, a PRACH and an SRS, it may be defined that a first part of the power increase transition time is before the start timing of the uplink transmission scheduled by the base station, and a later part of the power increase transition time is after the start timing of the uplink transmission scheduled by the base station.

For NO LBT, the UE may directly perform an uplink transmission according to the schedule of the base station without detecting the ending position of a downlink transmission of the base station. Herein, the starting part of the uplink signal of the UE still includes the power increase transition time. UE does not need to care the length of the time period between the uplink signal sent and the ending position of the downlink transmission of the base station. And the requirements on the time period between the ending of the downlink transmission and the uplink signal of the UE of NO LBT are guaranteed by the base station. For example, the base station may need to further send a signal occupying the channel after the last OFDM signal of a downlink data channel till the time period between the ending of the downlink transmission and the uplink signal of the UE meets the requirements of NO LBT. That is, the time period is smaller than or equal to 16 us. As shown in FIG. 14, the base station may reserve a time period of 16 us based on a UE which is close to the base station. In this way, for a UE farther away from the base station, due to an influence of a time advancement (TA) of the uplink signal, the length of the time period between the uplink signal of the UE and the ending position of downlink transmission of the base station may be shortened, therefore, the requirements on conversion time from a receiving end to a sending end of the UE may become more strict in fact.

As shown in FIG. 15, assuming that there are multiple UEs scheduled in one current sub-frame, the base station may reserve a time period of 16 us based on a UE closest to the base station among the multiple UEs. In this way, the time period between the ending position of the downlink sub-frame at the base station side and the starting position of the received UE uplink signal may be larger than 16 us. For the UE closest to the base station, after the influence of the TA of the UE is considered, the time period between the UE uplink signal and the ending position of the downlink transmission of the base station is about 16 us. While for other UEs farther away from the base station, due to a larger TA of the uplink signal is adopted, the time period between the uplink signal of the UE and the ending position of downlink transmission of the base station may be shortened, and thus the requirements on conversion time from a receiving end to a sending end of the UE may become more strict in fact.

A Third Example

Due to limitations of the device, a transition time of power adjusting of the device during actual working process is needed. The transition time may include a power increase transition time and a power decrease transition time. In the existing LTE systems, for a PUSCH, a PRACH and an SRS, the power decrease transition time of the UE is 20 us after the ending of corresponding uplink transmission. According to the 3GPP RAN4 specification, there are no requirements on the instantaneous value of the transmission power of the device in the transition time, but the transmission power of the device needs to reach a required value after the transition time.

On a carrier of an unlicensed band, the UE contends for a channel by executing LBT, and starts uplink transmission after completing LBT successfully. The above LBT may be CAT2 or CAT4. In addition, the LBT may also be NO LBT. For the power decrease transition time, the transmission power of the UE needs to be decreased to be below a certain value in a short time. Otherwise, the residual power in the transition time may interfere the CCA operations of other devices. For example, if the actual transmission power of the first 9 us of the UE in the 20 us power decrease transition time is high, the channel would be detected as busy by other UEs or WiFi terminals nearby in the first 9 us time period, and thus no uplink transmission would be started.

It is assumed that the power decrease transition time of the UE is Tt, which may be 20 us or of other values. For example, Tt may be smaller than 20 us. In this case, the device may adjust the power faster, which is favorable for the LBT mechanism. In order to avoid interferences on the CCA of other devices, as shown in FIG. 16, after the starting of the power decrease transition time of the UE, the transmission power of the UE is required to be decreased to be below a certain strength Pb from the OFF power before the moment Tb according to the present disclosure. In the time period after the moment Tb of the power decrease transition time, the transmission power is not required to be stabilized on the OFF power, but the power during this time period is required to be of a small value. For example, the transmission power after the moment Tb may be smaller than or equal to Pb. Pb may not equal to OFF power. Pb may be an absolute power value, or determined according to a target uplink transmission power of the current sub-frame of the UE. Tb may be smaller than or equal to Tt, and Tb needs to be of a smaller value. For example, Tb is far smaller than 9 us. The parameters Tb and Pb above may be configured by a higher layer signaling or predetermined. If Tb is a smaller value and Pb is a value small enough, after the power decrease transition time of one device starts, the channel would be detected as idle by other devices nearby.

Based on the method shown in FIG. 16, the power decrease time may start after the ending timing of an uplink transmission. Or, a first part of the power decrease transition time may be before the ending timing of the uplink transmission, and a later part may be after the ending timing of the uplink transmission. The length of the first part of the power decrease transition time may be configured by a higher layer signaling or predetermined. Particularly, the length of the first part may be Tb, after the uplink transmission is ended, although the transmission power of the UE is still unstable, the transmission power is decreased to a certain degree, such that the influence on the CCA of other devices is reduced.

Assuming that other UEs perform uplink transmissions on the last OFDM symbol of sub-frame n−1, due to the influence of the power decrease transition time, this UE may start to execute CAT2 after deferring a certain time x relative to the start timing of OFDM symbol 0 of sub-frame n. Wherein, x is larger than or equals to 0. And if the channel is detected as idle for T1us, for example, T1 equals to 25 us, the channel may be occupied by the UE for uplink transmission. That is, the timing that the UE starts the uplink transmission is T1+x us after the start timing of OFDM symbol 0 of sub-frame n. Wherein, x may be a predetermined value or a value configured by a higher layer signaling. And x may be public for a group of UEs, all UEs in a cell or all UEs in an entire network, such that the multiple UEs may start CAT2 in the same timing position and start uplink transmission at the same time. For example, the power decrease transition time may be labeled as Tt. x may equal to Tt. Or, x may be smaller than Tt. Assuming that the later part of the power decrease transition time is lower in power and would not prevent CCA operations of other UEs, the delay time x may be smaller than Tt. For example, based on the method of FIG. 16, the delay time x may equal to Tb. Since the power during the time period after Tb of the power decrease transition time is smaller than Pb, other UEs would not be stopped generally.

Assuming that the base station performs downlink transmission on the last OFDM symbol of sub-frame n−1, due to the influence of the time advancement (TA) of the UE and the power decrease transition time, this UE may start to execute CAT2 after deferring a certain time y relative to the start timing of OFDM symbol 0 of sub-frame n. Wherein, y=TA+z, and z is larger than or equals to 0. When the channel is detected as idle for T1us, for example, T1 equals to 25 us, the channel may be occupied for uplink transmission. That is, the timing that the UE starts the uplink transmission is T1+TA+z us after the start timing of OFDM symbol 0 of sub-frame n. TA is included in the delay time to compensate the influence of the timing overlapping of the uplink and downlink sub-frames caused by TA. And z is included in the delay time for compensating the influence of the power decrease transition time. z may be a predetermined value or a value configured by a higher layer signaling. z may be public for a group of UEs, all UEs in a cell or all UEs in an entire network, such that the multiple UEs may start CAT2 in the same timing position and start uplink transmissions at the same time. For example, the power decrease transition time may be labeled as Tt, and z may equal to Tt. Or, z may be smaller than Tt. Assuming that the power in the later part of the power decrease transition time is lower and does not prevent CCA operations of other UEs, the delay time z above may be smaller than Tt. For example, based on the method of FIG. 16, the delay time z may equal to Tb. And since the power during the time period after Tb of the power decrease transition time is smaller than Pb, other UEs may not be stopped generally. z may be the same or not the same as the parameter x in the method for processing the last OFDM symbol of sub-frame n−1 for other UEs.

Corresponding to the above methods, the present application also discloses a base station. As shown in FIG. 17, the base station device may include a scheduling module and a transceiving module.

The scheduling module is to allocate uplink resources to be occupied by UEs, determine an LBT mechanism, and determine an allowed transmission power of each UE according to a total amount of the uplink resources occupied by all the UEs scheduled in the current sub-frames.

The transceiving module is to send a scheduling signaling to the UEs, indicate the UEs to perform uplink and downlink transmission and correspondingly send downlink data and receive uplink data.

Corresponding to the above methods, the present application also discloses a UE. As shown in FIG. 18, the UE device may include a scheduling analyzing module and a transceiving module.

The scheduling analyzing module is to analyze a scheduling signaling from a base station, determine uplink and downlink resources allocated by the base station, determine an LBT mechanism and related parameters adopted by the base station for configuring uplink transmission and determine a maximum transmission power allowed.

The transceiving module is to receive the scheduling signaling from the base station, receive downlink data, execute uplink LBT and send uplink data when the LBT is successful.

Those ordinary skilled in the art may understand that all or part of steps for implementing the method embodiments above may be finished by instructing related hardware through programs. The programs may be stored in a computer or readable storage medium. And when being executed, the program may include one or combination thereof of the steps of the method embodiments.

Herein, respective function units in all embodiments of the present application may be integrated in one processing module, or respective units exist physically, or two or more units are integrated in one module. The integrated module may be implemented by adopting a hardware form or implemented by adopting a form of software function module. The integrated module may be stored in one computer-readable storage medium when implemented in the form of software function module and sold or used as an independent product.

The storage medium mentioned above may be a read-only storage, a magnetic disk or compact disc.

The abovementioned is merely preferable embodiments of the present disclosure, which cannot be used to limit the present application. And any modifications, equivalent replacements and improvements made within a spirit and principle of the present disclosure should fall within a protective scope of the present application.

The invention claimed is:

1. A method for transmitting uplink information, the method comprising:
   detecting, by a user equipment (UE), control information including uplink (UL)-Grant for scheduling uplink data transmissions;
   determining a maximum transmission power allowed in a current sub-frame according to the control information including the UL-Grant;
   determining an uplink transmission power of the UE;
   executing listen before talk (LBT) according to the UL-Grant;
   increasing the uplink transmission power of the UE to a certain strength Pa in a time period of Ta after a power increase transition time starts, wherein Ta and Pa are selected so that a channel is to be detected as busy by other devices nearby after the power increase transition time of a device starts, in case that the LBT is successful; and
   performing an uplink data transmission according to the increased uplink transmission power, in case that the LBT is successful.

2. The method of claim 1, wherein determining the maximum transmission power allowed in the current sub-frame, comprises:
   determining, according to a power offset $P_{O,c}$, the maximum transmission power allowed of the UE by $P_{CMAX,c}(i)+P_{O,c}$, and
   wherein the determining the uplink transmission power of the UE comprises:
   determining the uplink transmission power of the UE in a sub-frame i of a cell c according to the following formula, $$P_{PUSCH,c}(i) = \min \left\{ \begin{array}{l} P_{CMAX,c}(i) + P_{O,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

[dBm]

wherein, $M_{PUSCH,c}(i)$ is the number of Physical Resource Blocks (PRBs) occupied by a PUSCH; $P_o\_PUSCH,c(j)$ is a power offset configured by higher layer signaling; $PL_c$ is a link loss; $\alpha_c(j)$ is all or a part of a control compensation link loss; $f_c(i)$ is an accumulated value controlled by closed loop power; and $\Delta_{TF,c}(i)$ is a parameter related to Modulation Coding Scheme (MCS) of uplink transmission.

3. The method of claim 1,
wherein determining the maximum transmission power allowed in the current sub-frame comprises:
   determining, according to the control information including the UL-Grant, the maximum transmission power allowed of the UE as $P_{m,UE,c}(i)$, and
wherein the determining the uplink transmission power of the UE comprises:
   determining the uplink transmission power of the UE in a sub-frame i of a cell c according to the following formula, $$P_{PUSCH,c}(i) = \min \left\{ \begin{array}{l} P_{CMAX,c}(i), \\ P_{m,UE,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

[dBm]

wherein $P_{CMAX,c}(i)$ is the maximum transmission power configured to the UE on cell c; $M_{PUSCH,c}(i)$ is the number of PRBs occupied by a PUSCH; $P_o\_PUSCH,c(j)$ is a power offset configured by higher layer signaling; $PL_c$ is a link loss; $\alpha_c(j)$ is all or part of a control compensation link loss; $f_c(i)$ is an accumulated value controlled by closed loop power; and $\Delta_{TF,c}(i)$ is a parameter related to MCS of uplink transmission.

4. The method of claim 1, wherein determining the maximum transmission power allowed in the current sub-frame, and determining the uplink transmission power of the UE comprises:
   determining, by the UE, according to the control information including the UL-Grant, the uplink transmission power $P_{PUSCH,c}(i)$ in sub-frame i of a cell c and the maximum power spectral density Power Spectral Density (PSD) allowed $D_{m,UE,c}(i)$ of the UE; and
   transmitting, by the UE, uplink signals according to the uplink transmission power $P_{PUSCH,c}(i)$ when the PSD of the uplink transmission using $P_{PUSCH,c}(i)$ is smaller than or is equal to $D_{m,UE,c}(i)$; and otherwise, reducing, by the UE, the uplink transmission power till the PSD of the uplink transmission is smaller than or is equal to $D_{m,UE,c}(i)$.

5. The method of claim 1, wherein performing the uplink data transmission according to the uplink transmission power determined after the LBT is successful comprises at least one of the following:
   for CAT2 and CAT4, starting the power increase transition time of the UE following the last CCA time slot of the LBT operation immediately; or
   for NO LBT, deferring T3 us after the ending of a downlink transmission, taking such a moment as the start timing of the power increase transition time of the UE, wherein T3 is the length of the deferred time.

6. The method of claim 5, wherein the LBT comprises:
   for CAT4, occupying, by the UE, the channel only when CAT4 detection is finished before a moment t; for CAT2, occupying, by the UE, the channel only when the channel is detected as idle for T1 us before the moment t; for NO LBT, the length of period between the moment t and the ending of the downlink transmission is T3 us, wherein the start timing of the uplink transmission scheduled by a base station is t; or for CAT4, occupying, by the UE, the channel only when CAT4 detection is finished before moment t−Tt; for CAT2, occupying, by the UE, the channel only when the channel is detected as idle for T1 us before the moment t−Tt; for NO LBT, the length of period between the moment t−Tt and the ending of a downlink transmission is T3 us, wherein the start timing of the uplink transmission scheduled by a base station is t, and the power increase transition time of the UE is Tt.

7. The method of claim 1, wherein performing the uplink data transmission according to the uplink transmission power determined in case that the LBT is successful comprises at least one of the following:

for CAT2 and CAT4, the last CCA time slot of the LBT of the UE comprising the power increase transition time of the UE; or for NO LBT, a later part of the T3 us time period after the ending of a downlink transmission comprising the power increase transition time of the UE.

8. The method of claim 1, wherein performing the uplink data transmission according to the uplink transmission power determined after the LBT is successful comprises at least one of the following:

for CAT2 and CAT4, the last CCA time slot of the LBT of the UE comprising a first part of the power increase transition time of the UE; or for NO LBT, a later part of the T3 us time period after the ending of a downlink transmission comprises the first part of the power increase transition time of the UE.

9. The method of claim 8, wherein the LBT comprises:

for CAT4, occupying, by the UE, the channel only when CAT4 detection is finished before moment t−Tr; for CAT2, occupying, by the UE, the channel only when the channel is detected as idle for T1 us before the moment t−Tr; for NO LBT, occupying, by the UE, the channel after a time period of T3 us from the ending of the downlink transmission, wherein the start timing of the uplink transmission scheduled by a base station is t, and the residual time of the power increase transition time between the LBT ending moment and the start timing of the uplink transmission scheduled by the base station is Tr; or for CAT4, occupying, by the UE, the channel only when CAT4 detection is finished before moment t; for CAT2, occupying, by the UE, the channel only when the channel is detected as idle for T1 us before the moment t; for NO LBT, occupying, by the UE, the channel after a time period of T3 us from the ending of the downlink transmission, wherein the start timing of the uplink transmission scheduled by the base station is t, and a last part of the power increase transition time of the UE is the moment t.

10. The method of claim 1, wherein performing the uplink data transmission comprises:

in a time period of Tb after starting of a power decrease transition time of the UE, reducing a transmission power of the UE to be below a certain strength Pb, wherein Tb and Pb are selected so that the channel is to be detected as idle by other devices nearby after the power decrease transition time of one device starts.

11. The method of claim 1, wherein performing the uplink data transmission according to the uplink transmission power determined after the LBT is successful comprises:

at T1+x us after the start timing of OFDM symbol 0 of the sub-frame, performing, by the UE, the uplink data transmission according to the uplink transmission power determined, wherein T1 is a channel idle time required by CAT2, and x is a predetermined value or a value configured by higher layer signaling; or at T1+TA+z us after the start timing of OFDM symbol 0 of the sub-frame, performing, by the UE, the uplink data transmission according to the uplink transmission power determined, wherein T1 is a channel idle time required by CAT2, TA is a time advancement of the UE, and z is a predetermined value or a value configured by higher layer signaling.

12. A base station for transmitting uplink information, the base station comprising:

a transceiver; and a controller coupled with the transceiver and configured to control to:

transmit, to a user equipment (UE), control information including uplink (UL)-Grant for scheduling uplink data transmissions, and receive, from the UE, an uplink data transmission according to an increased uplink transmission power, in case that the LBT is successful, wherein a maximum transmission power allowed in a current sub-frame according to the control information including the UL-Grant is determined by the UE, wherein the uplink transmission power of the UE is determined, wherein listen before talk (LBT) according to the UL-Grant is executed by the UE, and wherein the uplink transmission power of the UE to a certain strength Pa in a time period of Ta after a power increase transition time starts is increased by the UE in case that the LBT is successful, wherein Ta and Pa are selected so that a channel is to be detected as busy by other devices nearby after the power increase transition time of a device starts.

13. A user equipment (UE) for transmitting uplink information, the UE comprising:

a transceiver; and a controller coupled with the transceiver and configured to control to:

detect control information including uplink (UL)-Grant for scheduling uplink data transmissions, determine a maximum transmission power allowed in a current sub-frame according to the control information including the UL-Grant, determine an uplink transmission power of the UE, execute listen before talk (LBT) according to the UL-Grant, increase the uplink transmission power of the UE to a certain strength Pa in a time period of Ta after a power increase transition time starts, wherein Ta and Pa are selected so that a channel is to be detected as busy by other devices nearby after the power increase transition time of a device starts, in case that the LBT is successful, and perform an uplink data transmission according to the increased uplink transmission power, in case that the LBT is successful.

* * * * *